United States Patent [19]
Wiemers et al.

[11] Patent Number: 4,760,125
[45] Date of Patent: Jul. 26, 1988

[54] THERMOPLASTIC POLYAMIDE BASED UPON DIMERIZED FATTY ACID AND POLYETHER POLYAMINE

[75] Inventors: Norbert Wiemers, Monhein, Fed. Rep. of Germany; Italo Albini, Pavia, Italy

[73] Assignee: Henkel Kommanditgesellschaft auf Aktien, Duesseldorf, Fed. Rep. of Germany

[21] Appl. No.: 892,729

[22] Filed: Jul. 29, 1986

Related U.S. Application Data

[63] Continuation of Ser. No. 678,230, Dec. 5, 1984, abandoned, which is a continuation of Ser. No. 359,167, Mar. 17, 1982, abandoned.

[30] Foreign Application Priority Data

Mar. 21, 1981 [DE] Fed. Rep. of Germany ....... 3111226

[51] Int. Cl.⁴ .............................................. C08G 69/34
[52] U.S. Cl. .............................. 528/339.3; 260/404.5; 528/335; 528/336; 528/340

[58] Field of Search ..................... 528/339.3, 340, 335, 528/336; 260/404.5 PA, 404.5 EO

[56] References Cited

U.S. PATENT DOCUMENTS

| | | | |
|---|---|---|---|
| 4,062,820 | 12/1977 | Mitchell et al. | 528/339.3 |
| 4,133,803 | 1/1979 | Klein | 528/335 |
| 4,218,351 | 8/1980 | Rasmussen | 528/345 |

FOREIGN PATENT DOCUMENTS

1319807  6/1973  United Kingdom .

*Primary Examiner*—Harold D. Anderson
*Attorney, Agent, or Firm*—Ernest G. Szoke; Henry E. Millson, Jr.

[57] ABSTRACT

This invention is directed to thermoplastic polyamides and the preparation thereof. The thermoplastic polyamides, which are prepared by condensing (a) dimerized higher fatty acids and (b) monomeric fatty acids with (c) polyether diamines and (d) aliphatic or cycloaliphatic diamines, are useful in melt adhesive compositions.

4 Claims, No Drawings

THERMOPLASTIC POLYAMIDE BASED UPON DIMERIZED FATTY ACID AND POLYETHER POLYAMINE

This application is a continuation of application Ser. No. 678,230, filed Dec. 5, 1984, now abandoned, which is a continuation of co-pending U.S. patent application Ser. No. 359,167, filed Mar. 17, 1982 now abandoned.

This invention is directed to thermoplastic polyamides. More specifically, this invention is directed to thermoplastic polyamides based upon dimerized fatty acids and amines containing at least two primary amino groups as well as ether groups and to the preparation thereof.

The preparation of polyamides from polycarboxylic acids, which are obtained by polymerization of unsaturated fatty acids, and from aliphatic and/or cycloaliphatic and/or aromatic and/or heterocyclic and/or arylaliphatic diamines, is well known. Suitable reactants include, for example, ethylenediamine, hexamethylenediamine, piperazine, and diaminodiphenylmethane as well as polyethers containing oligomeric, terminal amino groups (cf., U.S. Pat. No. 4,218,351). In such reaction products the proportion of short-chain components is greater than 57.5 mol percent, while the proportion that contains dimerized fatty acids structures is less than 30 mol percent. Also, British Pat. No. 1,319,807 discloses thermoplastic polyamides that are similarly structured with respect to the components mentioned but which differ, however, with regard to the amino component containing the ether groups. This component shall not contain more than an average of 5.6, preferably not more than 2.6, ether groups in the diamine.

The flexibility of the polyamides is a crucial prerequisite for the resistance of compounds to peeling at low temperatures. The polyamides known so far which are based upon dimeric fatty acids and ether diamines, are deficient regarding their flexibility and the adhesive strength related to it, particularly under peeling conditions.

Thus, there has been a need to develop polyamides having or imparting improved properties at low temperatures.

It is an object of the invention to provide polyamides having improved properties.

It is also an object of the invention to provide thermoplastic polyamides based upon dimerized fatty acids and aliphatic diamines containing ether groups.

It is a further object of the invention to provide a method of preparing thermoplastic polyamides, which method comprises the condensation of:

(a) from about 35 to 49.5 mol percent of dimeric higher fatty acids in combination with (b) from about 0.5 to 15 mol percent of $C_{12}$–$C_{22}$ monomeric fatty acids with (c) from about 2 to 35 mol percent of polyether diamines of the formula

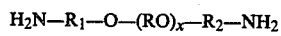

wherein x represents a number of from 8 to 80; $R_1$ and $R_2$, which may be the same or different, are each a divalent aliphatic or cycloaliphatic hydrocarbon having from 1 to 12 carbon atoms; and R represents a linear or branched divalent aliphatic hydrocarbon radical having from 1 to 6 carbon atoms, and (d) from about 15 to 48 mol percent of aliphatic or cycloaliphatic diamines having 2 to 40 carbon atoms in the aliphatic or cycloaliphatic moiety, in such a manner that acid and amine numbers of the polyamides are each from about 0.3 to 15.0.

These and other objects of the invention will become more apparent in the discussion below.

According to the invention, thermoplastic polyamides can be prepared which have improved properties at low temperatures and are based upon dimerized fatty acids and aliphatic diamines containing ether groups. The thermoplastic polyamides are prepared by condensing:

(a) from about 35 to 49.5 mol percent of dimeric higher fatty acids in combination with (b) from about 0.5 to 15 mol percent of $C_{12}$–$C_{22}$ monomeric fatty acids with (c) from about 2 to 35 mol percent of polyether diamines of the formula

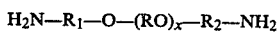

wherein x represents a number of from about 8 to 80, perferably from about 8 to 40; $R_1$ and $R_2$, which may be the same or different, each represent a divalent aliphatic or cycloaliphatic hydrocarbon radical having from 1 to 12 carbon atoms; and R represents a linear or branched divalent aliphatic hydrocarbon radical having from 1 to 6 carbon atoms, and (d) from about 15 to 48 mol percent of aliphatic or cycloaliphatic diamines having from 2 to 40 carbon atoms in the aliphatic or cycloaliphatic moiety, in such a manner that the acid and amine numbers of the polyamides are each from about 0.3 to 15.0.

Advantageously, component (a) comprises from about 40 to 48 mol percent of dimeric fatty acids, component (b) comprises from about 2 to 10 mol percent of monomeric fatty acids, component (c) comprises from about 4 to 25 mol percent of polyether diamines, and component (d) comprises from about 25 to 46 mol percent of aliphatic diamines. Also, advantageously from about 2 to 25 mol percent of alkanedicarboxylic acids having from 4 to 12 carbon atoms are employed in addition to the carboxylic acids of components (a) and (b).

The dimerized fatty acids of component (a) useful according to the invention frequently are called polymeric fatty acids and are commercially prepared by the polymerization of unsaturated higher fatty acids. As technical-grade products, they frequently contain approximately 50 percent by weight of dimeric fatty acids.

Also useful are mixtures of various polymeric fatty acids with a predominant proportion, that is, greater than 70 percent by weight, of dimeric fatty acid, which mixtures additionally contain a small proportion of monocarboxylic acids having from 12 to 22 carbon atoms. These monocarboxylic acids may be linear or branched and may contain one or more double bonds.

The polyether diamines to be used are known and primarily commercially available compounds. Typically representative polyether diamines include bis-(2-aminopropyl) polyoxypropylenes and bis-(3-aminopropyl)-polytetrahydrofurans, which have a molecular weight of from approximately 500 to 5,000. The especially mentioned representatives are preferred for their ready availability. It is understood that polyethers with two terminal amino groups comprising polymeric, optionally branched, butane diols, pentane diols, and hexane diols are also suitable. Mixed ethers with two primary amino groups can also be used.

Finally, low molecular weight diamines are also useful for the process of the invention in addition to the ether diamines. These include known diamines for the formation of polyamides, which have one linear or branched chain with two or more carbon atoms, such as, for example, ethylenediamine, 1,3diaminopropane, and/or 1,4diaminobutane, neopentyldiamine, hexamethylenediamine, and trimethylhexamethylenediamine. Also useful are diamines that were obtained from dimerized fatty acids and in which the carboxyl groups were substituted by amino groups. Products of this type are frequently called dimer diamines. Examples of cycloaliphatic diamines include diaminodicyclohexyl-methane and 3-aminomethyl -3,5,5-trimethycyclohexylamine. Less preferred are aromatic and heterocyclic diamines. An example of aromatic diamines is diaminodiphenylmethane; an example of arylaliphatic amines is xylylenediamine; and examples of heterocyclic amines include piperazine, dimethylaminopiperazine, and dipiperidylpropane.

As mentioned above, alkanedicarboxylic acids can be include in addition to the carboxylic acids of components (a) and (b). Suitable examples of such acids include adipic acid, azelaic acid, sebacic acid, and decanedicarboxylic acid.

The polyamides prepared according to the invention are prepared in a known process, by melting condensation. Here, the acid components react with the amine components at temperatures of from about 150° to 250° C., and the water of reaction can be removed by distillation or, if necessary, by the use of an azeotropic solvent and/or under vacuum. The amine or acid number can be influenced in known manner by the proper control of the reaction and the choice of a small excess of the acid or amino function, respectively.

The invention is also directed to thermoplastic polyamides prepared by the polycondensation of:

(a) a dimerized higher fatty acid having a dimer content greater than 70 percent by weight as well as (b) from about 2 to 10 percent by weight of $C_{16/18}$-fatty acid, based upon the weight of the dimerized fatty acid, with (c) bis-(3-aminopropyl)-polytetrahydrofuran having a molecular weight of from about 700 to 1500 and/or bis-(2-aminopropyl)-polyoxypropylene with a molecular weight of from about 1200 to 2500 as well as (d) diaminoethane, 1,3-diaminopropane, 1,4diaminobutane, and/or dimer diamine, and which have acid and amine numbers of from about 0.3 to 15.

The novel polyamides are characterized by a superior flexibility at low temperatures e.g. having a Flexibility Test Value of about −5020 C. or below. Since the adhesive properties have not been impaired in any way by the improvement in the flexibility, such polyamides are preferably suitable as melt adhesives for applications such as assembling, laminating, woodworking, and the shoe industry. They are characterized by exceptional adhesion in the bonding of plastics to themselves or other substrates such as wood, textiles, leather, and metal, under harsh environmental conditions, such as in a temperature range from −20° to 80° C.

The following examples are intended to illustrate the invention and should not be construed as limiting the invention thereto.

EXAMPLES

The condensation was performed in a glass flask suitably equipped with tubes, initially in a nitrogen atmosphere and with agitation. The carboxylic acids introduced were first heated to approximately 60° C., and then the other reaction components were added. The mixture was heated to 230° C. within one hour, and this temperature was maintained for one hour. During the next hour, a vacuum of 15 mbar was established at constant temperature. After cooling to 120° C., the reaction product was drained off and isolated for the determination of the properties. The following reaction components were used Dimerized higher fatty acid (I) with 72% dimer content;

Dimerized higher fatty acid (II) with 96% dimer content;

Tall oil fatty acid;

Sebacic acid;

Ethylenediamine;

Diamine prepared via the nitrile of a 96% dimerized higher fatty acid and followed by hydrogenation (designated "Dimer Diamine");

Bis-(3aminopropyl)-polytetrahydrofuran, MW 750 (designated "Polyether diamine A");

Bis-(3aminopropyl) polytetrahydrofuran, MW 1100 (designated "Polyether diamine B"); and Bis-(2-aminopropyl)-polyoxypropylene, MW 2000 (designated "Polyether diamine C").

The amounts used, in grams, as well as the amine and acid number of the reaction product, are recorded in the table below with regard to Examples 1 to 5. Also listed are the softening point (R+B, ASTM E-28) and the Flexibility Test Values, in °C., found at low temperatures. The Flexibility Test Values was determined herein by wrapping a test piece with the dimensions 20 mm×170 mm and a thickness of 1 mm, 360° around a brass cylinder with a diameter of 25.6 mm. The tests were carried out with decreasing temperatures (test piece and cylinder in temperature equilibrium) to determine the lowest temperature at which three to five test pieces survived the wrapping test without breaking.

TABLE 1

| Example Nos. | 1 | 2 | 3 | 4 | 5 |
|---|---|---|---|---|---|
| Dimeric fatty acid I (gm) | 795.2 | — | 795.2 | 795.2 | — |
| Dimeric fatty acid II (gm) | — | 820.8 | — | — | 653.1 |
| Tall oil fatty acid (gm) | 59.8 | 34.2 | 59.8 | 59.8 | 12.6 |
| Sebacic acid (gm) | — | — | — | — | 59.1 |
| Ethylenediamine (gm) | 81.0 | 63.5 | 83.2 | 82.8 | 81.9 |
| Dimer diamine (gm) | — | 173.4 | — | — | — |
| Polyether diamine A (gm) | 112.4 | 168.7 | — | — | — |
| Polyether diamine B (gm) | — | — | 123.6 | — | 167.1 |
| Polyether diamine C (gm) | — | — | — | 380.0 | — |
| Amine number | 0.7 | 5.5 | 7.6 | 2.9 | 5.2 |
| Acid number | 9.8 | 1.2 | 1.0 | 1.4 | 1.4 |
| Softening point (°C.) | 105 | 96 | 106 | 105 | 160 |
| Flexibility to °C. | −50 | −60 | −50 | −60 | −50 |

Comparison Tests

Using the procedures described above for Examples 1 to 5, polyamide condensation products were prepared from the following materials:

Comparison A:

802.5 gm of polymeric fatty acid I 55.5 gm of tall oil fatty acid 65.1 gm of ethylenediamine 95.1 gm of 4,7,10-trioxatridecan-1,13-diamine Comparison B:
810.0 gm of polymeric fatty acid I
45.0 gm of tall oil fatty acid
63.0 gm of ethylenediamine
91.8 gm of 4,9-dioxadodecan-1,12-diamine The results of testing are set forth in the following table:

TABLE 2

| Comparison No. | A | B |
|---|---|---|
| Amine number | 3.2 | 5.2 |
| Acid number | 5.2 | 1.6 |
| Softening point (°C.) | 93 | 92 |
| Flexibility (to °C.) | −30 | −25 |

As can be realized by a comparison of the results set forth in Tables 1 and 2, the polyamides prepared according to the invention had higher softening points and lower flexiblity temperatures.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A thermoplastic polyamide having acid and maine numbers of from about 0.3 to 15.0 each and having a flexibility Test Value of about −50° C. or below, which consists essentially of the polymeric condensation product of:
   (a) from about 35 to 49.5 mol percent of at least one dimeric fatty acid having from about 24 to 44 carbon atoms, in combination with
   (b) from about 0.5 to 15 mol percent of at least one monomeric fatty acid having from 12 to 22 carbon atoms; with
   (c) from about 2 to 35 mole percent of at least one polyether diamine of the formula $$H_2N-R_1-O-(RO)_x-NH_2$$

wherein x represents a number of from 8 to 80; $R_1$ and $R_2$, which are the same or different, are each a divalent aliphatic or cycloaliphatic hydrocarbon having from 1 to 12 carbon atoms; and R represents a linear or branched divalent aliphatic hydrocarbon radical having from 1 to 6 carbon atoms, and
   (d) from about 15 to 48 mol percent of at least one diamine selected from the group consisting of diaminoethane, 1,3-diaminopropane, and 1,4-diaminobutane.

2. The thermoplastic polyamide of claim 1 which consists essentially of the polymeric condensation product of from about 40 to 48 mol percent of component (a) and from about 2 to 10 mol percent of component (b) with from about 4 to 25 mol percent of component (c) and from about 25 to 46 mol percent of component (d).

3. The thermoplastic polyamide of claim 1 which consists essentially of the polymeric condensation product of
   (a) a dimerized fatty acid from about 24 to 44 carbon atoms and having a dimer content greater than 70 percent by weight, in combination with
   (b) from about 2 to 10 percent by weight, based upon the weight of the dimerized fatty acid, of a $C_{16-/18-}$ fatty acid with
   (C) bis-(3-aminopropyl)-polytetrahydrofuran with a molecular weight of from about 700 to 1500, bis-(2-aminopropyl)-polyoxypropylene with a molecular weight from about 1200 to 2500, or a mixture thereof, and
   (d) at least one diamine selected from the group consisting of diaminoethane, 1,3-diaminopropane, and 1,4-diaminobutane.

4. A melt adhesive composition consisting essentially of a thermoplastic polyamide of claim 1.

* * * * *